D. ROGERS.
Apparatus for Separating Refined Petroleum into Oils of Different Grades and Fire-Tests.
No. 211,055. Patented Dec. 17, 1878.
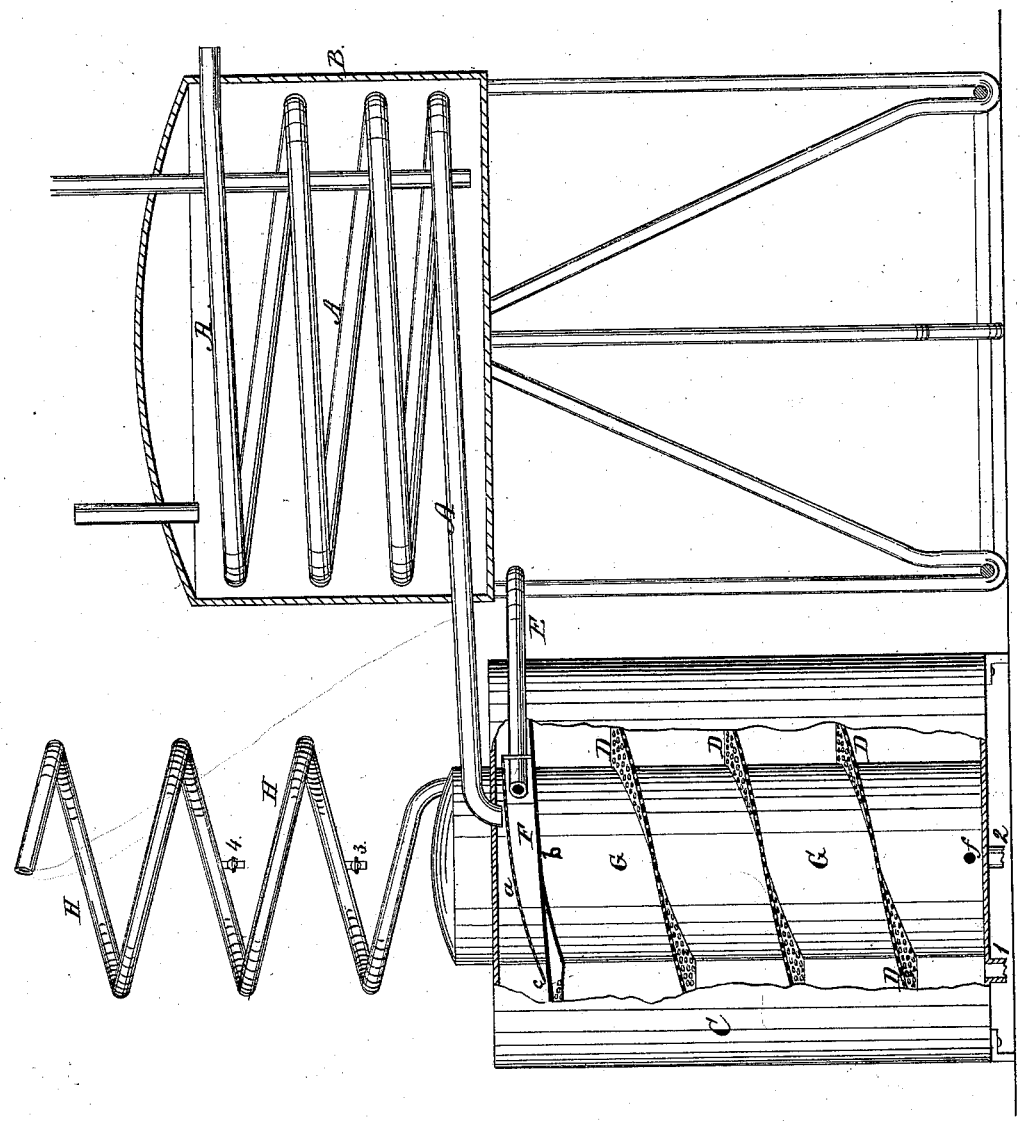

UNITED STATES PATENT OFFICE.

DAVENPORT ROGERS, OF GALION, OHIO.

IMPROVEMENT IN APPARATUS FOR SEPARATING REFINED PETROLEUM INTO OILS OF DIFFERENT GRADES AND FIRE-TESTS.

Specification forming part of Letters Patent No. 211,055, dated December 17, 1878; application filed July 24, 1878.

*To all whom it may concern:*

Be it known that I, DAVENPORT ROGERS, of Galion, in the county of Crawford and State of Ohio, have invented a new and useful Improvement in Apparatus for Separating Refined Petroleum into Oil or Distillates of Different Grades or Specific Gravities and Fire-Tests; and I do hereby declare that the following is a full, clear, and exact description of the same.

The object of my invention is to obtain from ordinary kerosene or refined petroleum a burning-oil of less volatility, and which shall consequently give a higher flash or fire test. In other words, my invention consists in an improved apparatus for removing or separating from kerosene its more volatile portion—to wit, the light hydrocarbon—for the purpose of obtaining an oil which, being heavier and less volatile than kerosene, shall be safer in practical use as a lamp or burning oil.

The invention will be understood from the following description by reference to accompanying drawing, which shows a partly-sectional elevation of my apparatus.

The oil or distillate is passed through a pipe, A, coiled in a steam-drum, B, having suitable induction and eduction pipes, and enters the separator C, where it is delivered upon an inclined foraminous plate, *a*, forming the top of an air-chamber, F, and placed at an acute angle with imperforate portion *b* of the spiral plate D, that extends from top to bottom of the cylinder. A blast of cold air is admitted through pipe E and said air-chamber F, and escapes therefrom through the holes in plate *a*, and also through the space *c* at the lower end thereof, and thence follows the spiral passage between the parallel portions of the perforated plate D until it enters the condensing-cylinder G through the hole *f* at the bottom of the latter.

By thus forcing cold air up through the body of heated oil as it flows over the inclined plate *a*, the same are, so to speak, commingled and brought at once into more intimate contact, and more light vapors are taken up by the air than is practicable with apparatus in which air is simply forced up through a shower of oil falling from a perforated tank as is illustrated in Patent No. 147,783.

In my apparatus I retain the feature of a current of air circulating in or through a chamber, in which oil falls in a shower; but I have found I produce a better result if I first force the air up through the body or bulk of oil as it flows over a perforated plate preparatory to passing the air through the shower of oil, which perfects the vaporizing and carbureting process. In circulating through the spiral passage the air comes several times in contact with the particles of heated oil, the latter being in a finely-divided state, in consequence of falling through the perforations in plate D. The air is thus carbureted by taking up the vaporized or more volatile portion of the oil—to wit—the light hydrocarbon—leaving the heavy hydrocarbon to flow off through the pipe 1, which leads to a suitable tank, (not shown,) and is properly sealed to prevent escape of air in that direction. This heavy oil is the product mainly desired, since it will give a high flash or fire test, and is therefore a much safer burning-oil than the original oil or kerosene from which it is derived.

The light hydrocarbon which is eliminated or taken up by the air on its passage through the cylinder C is mainly condensed in the condenser G and the coil H, which extends from the top thereof, while the air which entered the condenser through pipe E, and from which the light vapors have been thus eliminated, escapes from the coil H into the outer or free air. The heavier portion of such light hydrocarbon condenses in the condenser proper and escapes as liquid through the sealed pipe 2 into a suitable tank or receptacle, (not shown,) and the lighter portion condenses in the coil H and escapes as liquid through cocks 3 and 4. Thus, the light hydrocarbon, separated in the form of vapor from the kerosene that enters the cylinder C through pipe A, is condensed and separated into three grades of benzine or light liquid hydrocarbon.

What I claim is—

1. The steam heater or drum B, its contained coil of oil-supply pipe A, the separator-cylinder, spiral perforated flange D, and condenser G H, all combined as shown and described, and constituting an apparatus for separating refined petroleum or distillates into oils of different specific gravities and fire-tests, as specified.

2. The cylinder C, having oil-discharge pipe 1, and the inner concentric condensing-cylinder, G, having bottom opening and discharge-pipe, 2, and the condensing-worm H, having discharge-cocks 3 and 4, or more, all combined as shown and described, for the purpose specified.

3. The combination of the air-induction pipe, the air-chamber having a foraminous inclined top and slot or discharge-opening, $c$, at the smaller end thereof, and the oil-induction pipe arranged in connection with cylinder C, so as to discharge oil upon the upper end of said inclined top of the air-chamber, as shown and described.

DAVENPORT ROGERS.

Witnesses:
 JOHN HAWKER,
 R. W. JOHNSTON.